C. OLDENBURG.
GASOLENE SOLDERING IRON.
APPLICATION FILED MAR. 23, 1909.
970,740.
Patented Sept. 20, 1910.
2 SHEETS—SHEET 2.
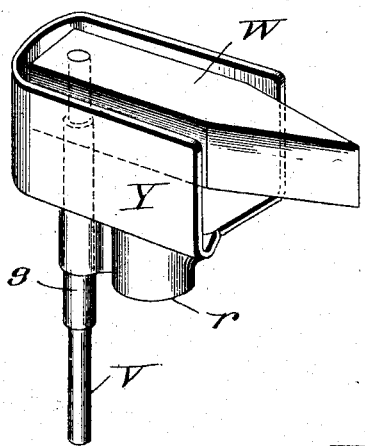
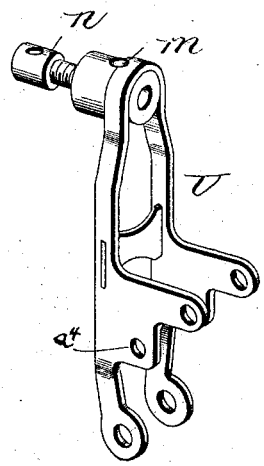
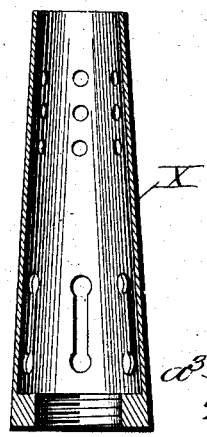
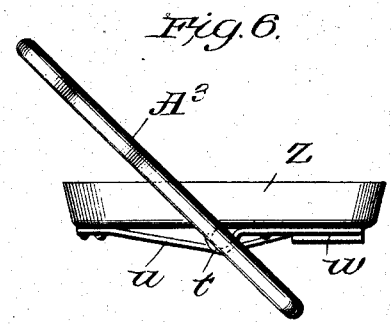
Witnesses
Inventor
C. Oldenburg.
Attorney

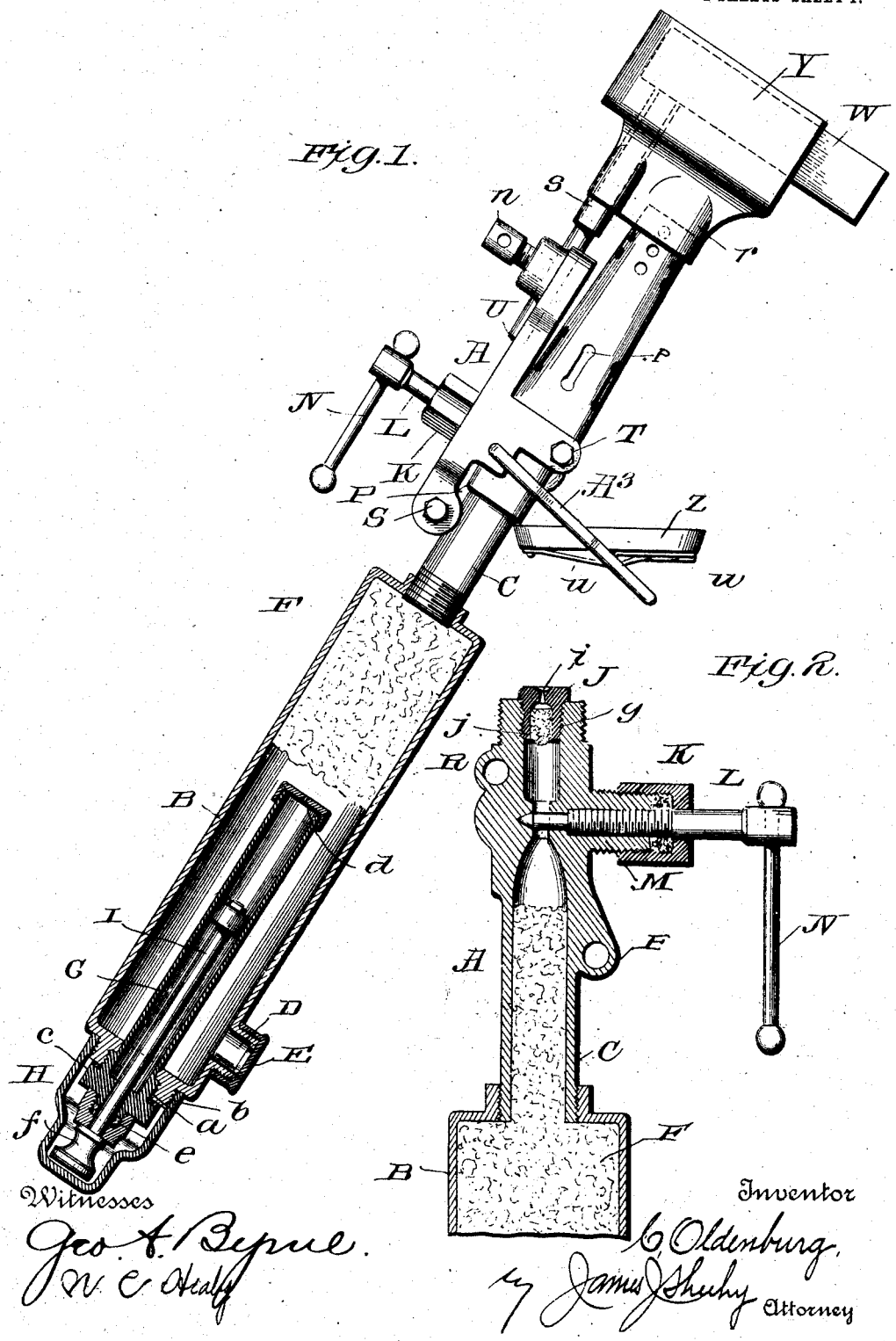

UNITED STATES PATENT OFFICE.

CHARLES OLDENBURG, OF HALIFAX, NOVA SCOTIA, CANADA.

GASOLENE SOLDERING-IRON.

970,740. Specification of Letters Patent. Patented Sept. 20, 1910.

Application filed March 23, 1909. Serial No. 485,156.

*To all whom it may concern:*

Be it known that I, CHARLES OLDENBURG, citizen of Canada, residing at Halifax, in the Province of Nova Scotia, Canada, have invented new and useful Improvements in Gasolene Soldering-Irons, of which the following is a specification.

My invention pertains to soldering irons such as embody reservoirs for gasolene or other suitable hydrocarbon and are constructed with a view of utilizing the combustion of the gasolene or other hydrocarbon for heating purposes; and it consists in the peculiar and advantageous soldering iron of the character stated as hereinafter described and particularly pointed out in the claims appended.

In the drawings, accompanying and forming part of this specification: Figure 1 is a view illustrating the soldering iron constituting the best practical embodiment of my invention of which I am cognizant as complete and ready for use. Fig. 2 is a view illustrating the body of my improved device. Fig. 3 is a detail perspective view showing the iron and its shank and the shield used in connection with the iron as properly arranged relative thereto. Fig. 4 is a detail perspective view illustrating the iron holder and the set screw for engaging the shank of the iron. Fig. 5 is a detail view of the burner tube. Fig. 6 is a detail view illustrating the preheating pan and the bail by which the same is carried, and Fig. 7 is a detail section taken through the longitudinal center of the preheating pan and illustrating the means through the medium of which said pan is held in various positions on the cross-bar of the bail, while Fig. 8 is a detail view illustrating the preheating pan and the bail in inverted plan.

Similar letters designate corresponding parts in all of the views of the drawings, referring to which:

A is the body of my novel device, which preferably comprises a hollow handle portion B designed to serve as a gasolene reservoir, and a tube C fixed to the upper end of and communicating with the hollow handle portion B. The combined handle portion and reservoir B is provided with a filling aperture D designed to be normally closed by a screw cap E, and in the said handle portion and reservoir is arranged a body of absorbent material F which extends up into the tube C with a view of preventing a too free feed of gasolene thereto. At its lower end the said combined handle portion and reservoir B is interiorly and exteriorly threaded as indicated by $a$ and $b$, respectively; the interior thread $a$ being for the engagement of the lower threaded portion of a pump cylinder G, while the exterior thread $b$ is for the engagement of a base cap H which is designed to inclose the lower end of the pump cylinder G and the pump piston I when the device is not in use. The pump shown has for its office to supply the interior of the handle portion B with air under pressure, and the cylinder G is provided adjacent to its lower end with a portion $c$ of angular form for the engagement of a wrench. The piston I is designed to force air through a minute aperture $d$ in the upper end of the cylinder G, and the rod of the piston extends through a suitable stuffing box $e$ at the lower end of the cylinder and terminates in a finger-piece $f$. Thus it will be seen that when the base cap H is removed, the operator is enabled while holding the combined handle portion and reservoir in his left hand, to reciprocate the piston I with his right hand so as to supply the reservoir with air under pressure and in that way assure the maintenance of an adequate supply of gasolene to the burner tube hereinafter described in detail.

The tube C terminates at its upper end in an exteriorly and interiorly threaded portion $g$; the interior thread being for the engagement of a bored plug J which is provided at its upper end with a minute aperture $i$ for the discharge of gasolene, and is also provided in the lower portion of its bore with a strainer $j$, the latter being designed to prevent foreign particles in the gasolene from reaching and clogging the said discharge aperture $i$. At one side the tube C is provided with a packing gland K through which passes a needle valve L which is threaded in an arm M of the tube and has for its office to control the passage of gasolene from the reservoir to the said discharge aperture $i$. The said needle valve L is provided at its outer end with a suitable handle N, and through the medium of said valve it is obvious that the supply of gasolene to the aperture $i$ may be regulated and cut off at the will of the operator.

In addition to the features mentioned, the pipe C is provided at one side with an apertured lug P and is also provided at its opposite side in a plane above that of the lug P with an apertured lug R. Connected by bolts S and T to the lugs P and R is the iron holder U of the device, which holder is provided at $m$ with a vertical bore and at $n$ with a set screw. The bore $m$ receives the shank V of the iron W, and the said shank is detachably secured in the holder through the medium of the before-mentioned set screw $n$.

X is the burner tube which is screwed on the upper end of the tube or pipe C and is provided with apertures $p$ for the admission of air to support combustion. The said burner tube is tapered upwardly, and on the upper portion thereof is removably arranged the depending sleeve $r$ of the shield Y, which shield is disposed at opposite sides of and back of the iron W and is provided with a second depending sleeve $s$ which receives the shank V of the iron W. Thus it will be seen that when the set screw $n$ is loosened, the shield Y and the shank V of the iron may be lifted together off the burner tube X and the holder U, respectively.

Z is a preheating pan comprised in my improvements, and $A^3$ is a bail which carries the said pan, and through the medium of which the pan is connected with the iron holder U. The preheating pan is provided at its under side, as best shown in Figs. 7 and 8, with bearings $t$, separated by an intervening space, and extending longitudinally of the pan and through the said space is a spring strip $u$ which is connected at one end to the bottom of the pan, and has its opposite end socketed in a sheath $w$ on the under side of the pan. The bail $A^3$ has a cross-bar $x$ which extends through the bearings $t$, and is provided opposite the before-mentioned intervening space with a portion of angular form in cross-section. It will also be noticed that the said angular portion, which is lettered $y$, is interposed between the bottom of the pan Z and the spring strip $u$, and from this it follows that the pan will remain in various positions in which it is placed on the cross-bar $x$ for a purpose presently set forth. In addition to the cross-bar $x$, the bail $A^3$ is provided with resilient arms $z$, and these latter terminate in inwardly directed portions $a^3$ which are sprung into apertures $a^4$ in the iron holder U. From this it follows that when necessity demands, the bail $A^3$ may be expeditiously and easily disconnected from the said holder U; also, that the bail may be as readily connected to the holder U and in such manner that there is no liability of the bail becoming casually disconnected. It will further be understood that the bail and pan may be positioned as illustrated, relative to the tube or pipe C, when it is desired to burn gasolene or other hydrocarbon in the pan for preheating purposes, and that when the pan is not in use the bail and the pan may be swung downward so that the latter will rest close to and parallel with the pipe or tube C, in which posititon both pan and bail will be out of the way and not liable to interfere with the manipulation of the device.

In the practical use of my novel device, the pump piston is actuated to charge the gasolene reservoir with air under pressure, and the burner tube X is preheated in the manner before described as is also the soldering iron W and its shield Y. With this done, the needle valve L is opened to the necessary extent when a jet of gasolene will be discharged up into the tube X, where it will be consumed with the result that the iron W will be maintained in a highly heated state for an indefinite period; it being understood that the operator actuates the pump piston at suitable intervals in order to maintain an adequate supply of air under pressure in the combined handle and reservoir B.

It will be gathered from the foregoing that my novel soldering iron is adapted to be manipulated with the same facility and to the same advantage as an ordinary soldering iron, and that the shield Y serves to confine the flame about and in close proximity to the iron W so that the flame is used to the best advantage for heating the iron and is not liable to be affected by the wind. It will be further gathered from the foregoing that because of the novel relative arrangement of the parts and the connections of said parts, many of the elements of my novel device may be readily removed when worn out or otherwise deteriorated, and as readily replaced with new parts without affecting the original parts remaining in the device.

Having described my invention, what I claim and desire to secure by Letters-Patent, is:

1. The combination in a gasolene soldering iron, of a combined gasolene reservoir and handle portion, a pump carried by said reservoir and handle portion for charging the same with air under pressure, a tube fixed to and communicating with the reservoir and handle portion and having a minute discharge aperture in its end remote therefrom, a valve for controlling the passage of gasolene through the said tube, a burner tube fixed with respect to and extending from the first named tube and tapered toward its upper end, an iron-holder fixed on the first named tube and having a vertical bore, a set screw bearing in said holder and arranged to extend to said bore, an iron having a shank disposed in the bore of the holder and engaged by said set screw, a shield for the iron having a depending sleeve snugly receiving the burner tube and also having a depending sleeve receiving the shank of the iron, a bail connected with the iron holder, and arranged to be swung up and down, and a preheating pan carried by and adjustable on the said bail.

2. The combination in a gasolene soldering iron, of a combined gasolene reservoir and handle portion threaded at its lower end, a pump for charging the reservoir and handle portion with air under pressure having a cylinder fixed therein and projecting beyond the lower end thereof and also having a piston the rod of which extends below the cylinder, and a base cap engaging the threaded lower end of the reservoir and handle portion and inclosing the lower ends of the pump cylinder and piston rod.

3. The combination in a gasolene soldering iron, of a burner tube, a valved tube for supplying the burner tube with gasolene, an iron-holder fixed on the valved tube, an iron having a shank connected with the holder, a bail connected with and arranged to swing on the iron-holder and having a cross-bar partly of angular form in cross-section, a preheating pan arranged on the cross-bar of the bail and having bearings receiving the portions of the cross-bar at opposite ends of the angular portion thereof, and a spring strip connected with the bottom of the pan and disposed at the opposite side of the cross-bar, with reference to the pan.

In testimony whereof I have hereunto set my hand in presence of two subscribing witnesses.

CHARLES OLDENBURG.

Witnesses:
ALEXANDER HOBRECKER,
PETER F. MORIARTY.